United States Patent [19]

Takahashi et al.

[11] 4,229,650
[45] Oct. 21, 1980

[54] POSITION AND PRESENCE DETECTING DEVICE FOR STACKED SHEET MEMBERS

[75] Inventors: Yuji Takahashi, Tokyo; Hisaji Masaki, Kawasaki, both of Japan

[73] Assignee: Canon Kabushiki Kaisha, Tokyo, Japan

[21] Appl. No.: 969,367

[22] Filed: Dec. 14, 1978

[30] Foreign Application Priority Data

Dec. 14, 1977 [JP] Japan ............................. 52-150342

[51] Int. Cl.² ........................................... G01N 21/30
[52] U.S. Cl. ............................. 250/223 R; 250/561
[58] Field of Search .................. 250/223 R, 560, 561, 250/222

[56] References Cited

U.S. PATENT DOCUMENTS 2,617,048  11/1952  Wagner et al. ................. 250/561 X

*Primary Examiner*—David C. Nelms
*Assistant Examiner*—Darwin R. Hostetter
*Attorney, Agent, or Firm*—Fitzpatrick, Cella, Harper & Scinto

[57] ABSTRACT

A position detecting device for detecting the upper end position of stacked sheet members which are cut into a determined size, transported by a conveyor and successively stacked on a sheet stacking table. Said detecting device is positioned across a transport path of said sheet member in such a manner as to detect the upper end position of sheet members successively stacked on said sheet stacking table.

14 Claims, 6 Drawing Figures

4,229,650

POSITION AND PRESENCE DETECTING DEVICE FOR STACKED SHEET MEMBERS

BACKGROUND OF THE INVENTION

1. Field of the Invention

The present invention relates to a device for detecting the position of stacked sheet members, and more particularly to a device for detecting the upper end position of stacked sheet members.

2. Description of the Prior Art

High speed copiers, and recording devices or printers for recording output of computers (hereinafter collectively called recording apparatus) require a stacking device capable of stacking as many output sheets as possible in order to minimize the time of interruption of function. In such stacking devices, in order to stably stack an elevated number of sheet members, it is required that the uppermost face position of the stacked sheet members is constantly maintained within a determined range with respect to a sheet ejecting device of the recording apparatus. In order to meet this requirement it has conventionally been proposed, as shown in FIG. 1, to provide, at an exit 5 of output sheet members 5, a sheet stacking table 4 for stacking said sheet members 5 ejected from ejecting rollers 6 of the recording device, also to provide a photoelectric sensor consisting of a photoemitter 1 and a photoreceptor 2 in a front end position of the sheet ejecting direction to detect if a light beam 7 emitted from the photoemitter 1 is interrupted by the elevation of the upper end level of the stacked sheet members, and to lower the sheet stacking table 4, in case of such interruption, to a position where said interruption no longer takes place. However, such arrangement where the stack level detection is conducted only at the front end position thereof, may cause excessive elevation of the rear end of the stacked sheet members for example by sheet curling as shown in FIG. 2 beyond the level of the exit of sheet members to the stacking device to clog said exit 5, thereby leading to sheet jamming in the stacking device or at said exit. On the other hand if the photoelectric sensor is positioned lower than in the above-mentioned arrangement in order to avoid such jamming, a longer distance from the exit 5 to the upper stack end may result in a defective alignment of the sheet members. Also such defective sheet alignment may result if the sheet stacking table is excessively lowered because of the curling of the front end of the sheet members as shown in FIG. 3.

SUMMARY OF THE INVENTION

The object of the present invention is to provide a position detecting device for stacked sheet members capable of exactly determining the position of sheet members stacked on a sheet stacking member.

Another object of the present invention is to provide a position detecting device for stacked sheet members enabling exact stacking of an elevated number of sheet members on a sheet stacking member.

Still another object of the present invention is to provide a position detecting device for stacked sheet members allowing exact transportation of the sheet members by the transporting means even if the sheet members are not stacked on the sheet stacking member in a desired form.

DESCRIPTION OF THE PREFERRED EMBODIMENT

The present invention will become fully apparent from the following description of an embodiment thereof taken in conjunction with the attached drawings.

Figure 1:
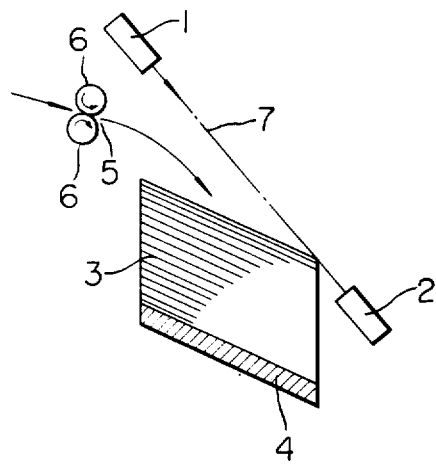
FIGS. 1 to 3 are lateral views of an example of the conventional stack level detecting device.
Figure 2:
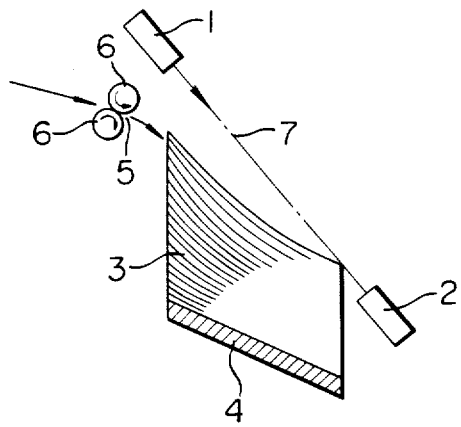
Figure 3:
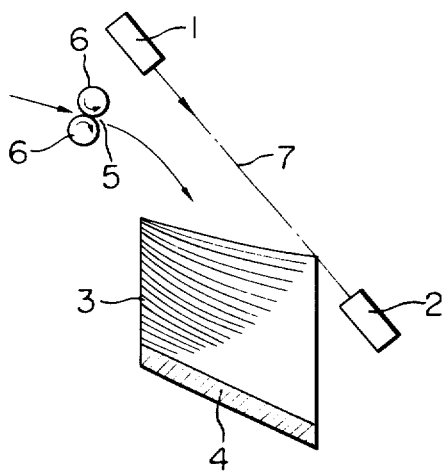
Figure 4:
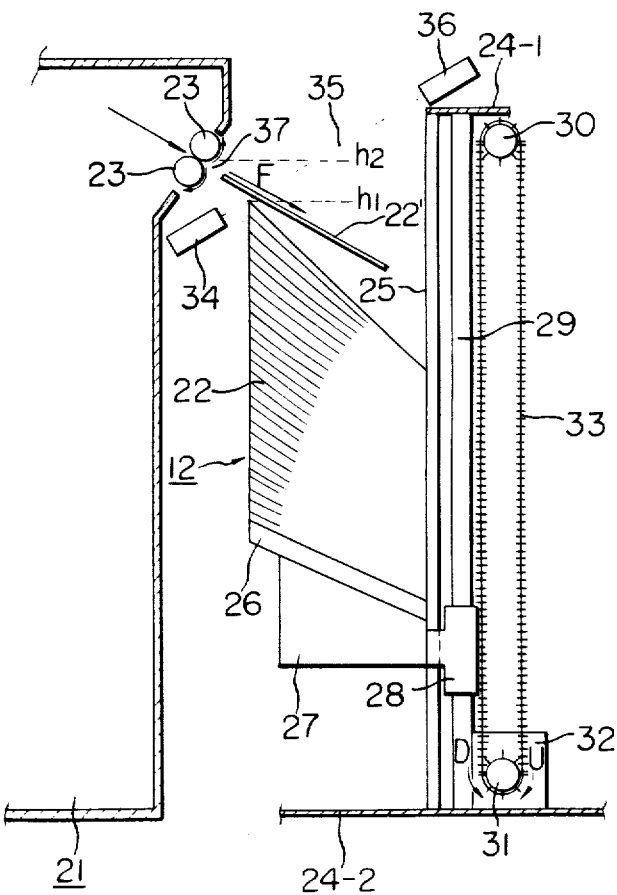
FIG. 4 is a lateral view of a stack level detecting device embodying the present invention.

Referring to FIG. 4 there is shown a known recording apparatus 21 such as a copier, a recording device or a printer, from which an output sheet member 22 subjected to a recording process therein is transported in the direction of arrow F by means of sheet feed rollers 23, said sheet member being a cut sheet which has been previously cut into a determined size, for example, lettersize. Upon leaving said feed rollers 23, the sheet member 22 is stacked on a stacking table 26, the position of said sheet member 22 being defined by a stopper 25 fixedly provided between base members 24-1 and 24-2. Said stacking table 26 is fixedly mounted on a support member 27 of which an integral part is formed as a hollow cylindrical guide 28 slidably mounted on a tubular rail 29 fixedly provided between said base members 24-1, 24-2 to enable displacement of said stacking table 26 along said rail 29.

On said base member 24-1 there is rotatably mounted an idler sprocket 30 while on said base member 24-2 there is mounted a motor 32 the drive shaft of which is connected through an unrepresented gear train to a drive sprockets 30 and 31, and between said sprocket a chain 33 is provided and is connected, at a part thereof, to said guide 28.

Thus it is possible to displace the stacking table 26 upwards or downwards by rotating said drive sprocket 31 respectively in the direcţon of arrow U or arrow D by means of said motor 32.

A sheet detector is composed of a photoemitter 34 for emitting a light beam 35 and a photoreceptor 36 for receiving said light beam. Said sheet detector is positioned in such a manner as to detect the upper end of the sheet members 22 stacked on the stacking table 26 and also to detect the passage of the sheet member 22′ transported by the feed rollers 23.

More specifically a sheet member outlet 37 formed by said feed rollers 23, of a height h2, is located higher than the detecting position, of a height h1, of the upper end of sheet members stacked on the stacking table 26.

Further said sheet detector is provided to detect the rear end position, in the transport direction, of the sheet members stacked on the stacking table 26.

Figure 5:
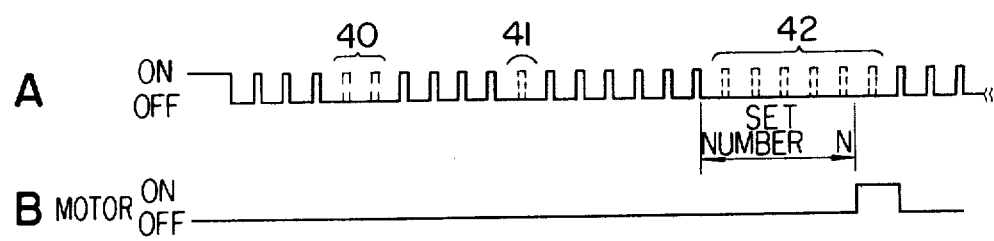
FIG. 5 is a signal wave-form chart explaining the stack level detecting device of the present invention.

As shown in FIG. 5, the output of the photoreceptor 36 repeatedly assumes on and off states as the light beam from the photoemitter 34 is interrupted upon each ejection of a sheet member 22′, said on and off states signifying the output respectively when the light beam is not interrupted or interrupted by the ejected sheet member. In the present embodiment the sheet member detecting device is in the above-mentioned manner provided in the ejecting path of the sheet member. The stack level becomes elevated as the stacking of sheet members proceeds to eventually interrupt the light beam thereby providing a continuously off output as shown by 42 in FIG. 5A. The time from the start of such off state is judged in order to identify if such off state is originated from temporary perturbation of the sheet surface as shown by 40 and 41 in FIG. 5A. If said off state continues after a determined period there is generated a signal for descending the stacking table to a position where the output of photoreceptor again assumes the on state. The above-explained functions will be explained in the following in conjunction with the block diagram shown in FIG. 6. The output of the photoreceptor 36 is supplied, in the form of signals shown in FIG. 5A after amplification in an amplifier 43, to a counter 44 which is instructed to start counting at the leading end of thus supplied output signals. Said counter 44, receiving clock signals from a clock signal generator 45, starts counting of said clock signals upon receipt of said instruction, and is adapted to clear the result of counting and to start the counting anew upon receipt of a new count start instruction during the course of preceding counting operation.

Thus, if said counter 44 is structured in such a manner as to release a signal for driving the aforementioned motor 32 in the direction of arrow D to a signal line 47 when the count of said counter 44 exceeds a determined number N set in a setter 46, it is rendered possible to drive the motor 32 from the completion of counting of set number N to the release of the first pulse signal from the amplifier 43.

For example if it is assumed that the clock pulses are generated at an interval of 0.5 sec. while the sheet members are transported at an interval of 1 sec. in the normal state and a number N=10 is memorized on said setter, the counter 44 is cleared after each 2 count and never reaches the set number N=10 as long as the upper end of the stacked sheet members does not interrupt the light beam 35 and the sheet members 22' are transported in the normal state.

However, in case the upper end of the stacked sheet members interrupts the light beam 35 to prevent the same from reaching the photoreceptor 36, the counter 44 continues to count the clock pulses to eventually reach the set number N=10 thereby driving the motor 32 in the direction of arrow D.

Figure 6:
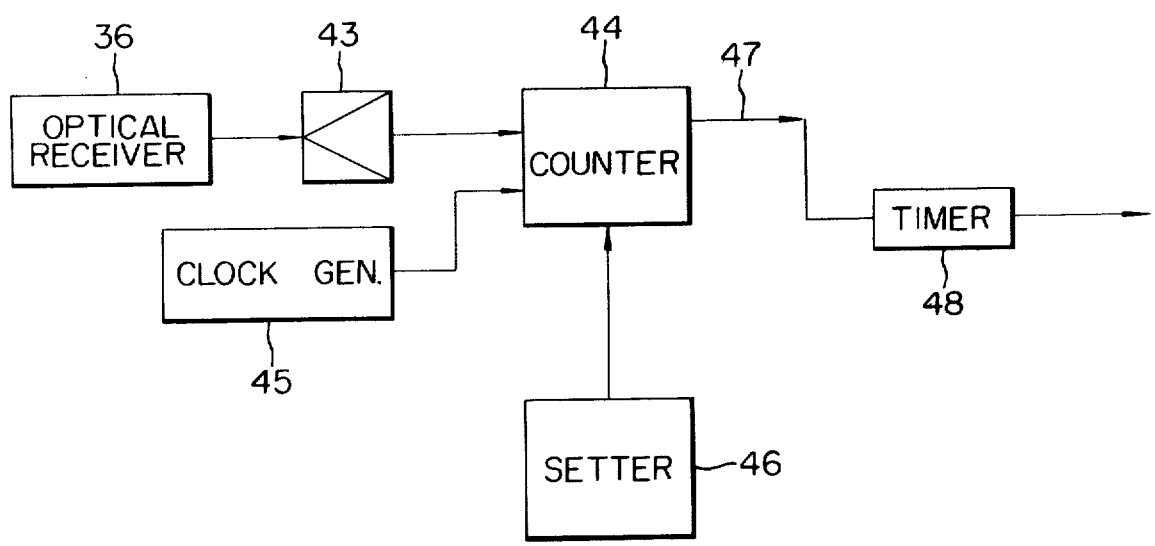
FIG. 6 is a block diagram of the stack level detecting device of the present invention.

Upon descent of the stacking table 26 by means of said motor 32 the photoreceptor 36 again receives the light beam 35 to clear the counter 44 thereby terminating the function of said motor 32. In the foregoing explanation the motor 32 is driven by an output signal from the counter 44 to the line 47, but it is also possible as shown in FIG. 6 to supply the signal on said line 47 to a timer circuit 48 which drives the motor 32 after a determined time fixed by said timer 48, and it is rendered possible in this manner to obtain a fixed amount of descent of the stacking table 26 by means of such timer circuit 48. Also the above-mentioned set number N can be experimentally determined from the size of the sheet member and the transport speed thereof.

Thus it is rendered possible to maintain the upper end level of the stack within a determined range with respect to the sheet member outlet and to achieve a stable stacking of an elevated quantity of the sheet members.

Although the foregoing embodiment has been explained with reference to a photoelectric sensor, the present invention is by no means limited to such sensor but naturally covers the use of other sensors such as an ultrasonic sensor or a microswitch. Also in the foregoing embodiment there has been employed a motor for displacing the stacking table, it will be readily understood that other actuators, such as a solenoid, a motor cylinder or a display device can also be employed for the same purpose. Furthermore, although the detection in the foregoing embodiment is carried out at the rear end of the sheet member in the stacking device with respect to the sheet transport direction, it will also be readily understood that such detection can be likewise achieved at a lateral end of the sheet members.

What we claim is:

1. A position detecting device for stacked sheet members, comprising:
   transport means for transporting sheet members;
   a sheet stacking member for stacking thereon the sheet member transported by said transport means;
   sheet detecting means positioned in such a manner as to detect the passage of the sheet members transported by said transport means and to detect the sheet members stacked on said sheet stacking member; and
   identifying means responsive to the output of said sheet detecting means for identifying that the upper end of the sheet members stacked on said sheet stacking member reaches a determined position.

2. A position detecting device according to the claim 1 wherein said identifying means comprise a first identifying means for identifying whether the detection period of said sheet member by said sheet detecting means is less than or more than a determined period.

3. A position detecting device according to the claim 1, further comprising:
   an aligning member for aligning the sheet members transported by said transport means and to be stacked on said sheet stacking member.

4. A position detecting device according to the claim 1 wherein said sheet detecting means comprise a beam generator for emitting a beam and beam detecting means for detecting arrival of said beam.

5. A position detecting device according to the claim 2, wherein said first identifying means comprise setting means for setting a determined time, and second identifying means for identifying if the detection period of said sheet member by said sheet detecting means is less than or more than said determined time of said setting means.

6. A position detecting device according to the claim 5 wherein said second identifying means is a counter.

7. A position detecting device according to the claim 5 wherein said setting means is number generating means.

8. A position detecting device for stacked sheet members, comprising:
   a sheet stacking member for stacking thereon sheet members transported thereto;
   drive means for driving said sheet stacking member to displace the position thereof;
   sheet detecting means positioned in such a manner as to detect the passage of the sheet members thus transported and to detect the upper end of the sheet members stacked on said sheet stacking member; and
   identifying means adapted to displace said sheet member upon identification, by means of the output from said sheet detecting means, when the upper end of the sheet members stacked on said sheet stacking member reaches a determined position.

9. A position detecting device according to the claim 8 further comprising guide means for guiding said sheet stacking means.

10. A position detecting device according to the claim 8 wherein said drive means comprises a motor.

11. A position detecting device according to the claim 8, wherein said identifying means comprise displacing means adapted for displacing said sheet stacking member by a determined amount.

12. A position detecting device according to the claim 11 wherein said displacing means comprise timer means.

13. A position detecting device according to the claim 12, further comprising supply means for supplying signals from said timing means to said drive means in order to drive said drive means for a determined period.

14. A position detecting device for stacked sheet members, comprising:
    transport means for transporting sheet members;
    a sheet stacking member for stacking thereon the sheet members transported by said transport means, said stacking member being rendered vertically displaceable;
    sheet detecting means for detecting the upper end position, at an end facing said transport means, of the sheet members transported by said transport means and stacked on said sheet stacking member, and also for detecting the passage of the sheet members transported by said transport means; and
    identifying means for lowering said sheet stacking member by a determined amount upon identification, by the output of said sheet detecting means, of the arrival of the upper end of stacked sheet members at a determined position.

* * * * *